(12) United States Patent
Deng et al.

(10) Patent No.: US 8,018,956 B1
(45) Date of Patent: Sep. 13, 2011

(54) SYSTEM AND METHOD FOR PROVIDING RECOVERY AND RESYNCHRONIZATION FOR A TUNNELING PROTOCOL

(75) Inventors: Mingqi Deng, Mountain View, CA (US); Samuel G. Henderson, Raleigh, NC (US); Vinaychandra Shankarkumar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 12/251,625

(22) Filed: Oct. 15, 2008

(51) Int. Cl.
*H04L 12/56* (2006.01)

(52) U.S. Cl. ................................... 370/401

(58) Field of Classification Search .......... 370/352, 370/401
See application file for complete search history.

(56) References Cited

U.S. PATENT DOCUMENTS

| | | | |
|---|---|---|---|
| 6,078,957 | A | 6/2000 | Adelman et al. |
| 6,724,777 | B1 * | 4/2004 | Yamazaki et al. ............ 370/473 |
| 6,938,091 | B2 | 8/2005 | Das Sharma |
| 7,031,904 | B1 * | 4/2006 | Wilson et al. ................ 709/230 |
| 7,082,130 | B2 | 7/2006 | Borella et al. |
| 7,136,377 | B1 | 11/2006 | Tweedly et al. |
| 7,171,491 | B1 | 1/2007 | O'Toole et al. |
| 7,649,890 | B2 * | 1/2010 | Mizutani et al. ......... 370/395.21 |
| 7,860,049 | B2 * | 12/2010 | Yagyuu et al. ................ 370/328 |
| 2006/0159011 | A1 * | 7/2006 | Dalal et al. ................... 370/220 |

OTHER PUBLICATIONS

Juniper Networks, Inc., "JUNOSe™ Internet Software for E-series™ Routing Platforms—Broadband Access Configuration Guide," Release 7.3.x, 516 pgs., Aug. 31, 2006.
Network Working Group—Internet Draft, "Fail Over extensions for L2TP 'failover' draft-ietf-l2tpext-failover-12.txtl," http://tools.ietf.org/html/draft-ietf-l2tpext-failover-12, 22 pgs., Sep. 13, 2008.

* cited by examiner

*Primary Examiner* — Ricky Ngo
*Assistant Examiner* — Chandrahas Patel
(74) *Attorney, Agent, or Firm* — Patent Capital Group

(57) ABSTRACT

An apparatus is provided in one example embodiment and it includes a first node coupled to an active endpoint and a standby endpoint. The first node communicates with a second node. When the active endpoint experiences a failure, the standby endpoint is activated such that a communication involving the second node continues. The standby endpoint communicates a complete window's worth of packets to the second node after the failure, the window's worth of packets including a last known sequence number acknowledged by the second node. In more specific embodiments, the first node is an L2TP network server (LNS) and the second node is an L2TP access concentrator (LAC). The last known sequence number was check pointed by the active endpoint to the standby endpoint.

16 Claims, 2 Drawing Sheets

SYSTEM AND METHOD FOR PROVIDING RECOVERY AND RESYNCHRONIZATION FOR A TUNNELING PROTOCOL

TECHNICAL FIELD OF THE INVENTION

This invention relates in general to the field of communications and, more particularly, to a system and a method for providing recovery and resynchronization for a tunneling protocol.

BACKGROUND OF THE INVENTION

Networking architectures have grown increasingly complex in communication environments. This complexity has resulted in numerous protocols being implemented to ensure that network elements are directing packets in an efficient manner. For example, certain network elements may offer recovery and resynchronization to an architecture: ensuring that there is a consistent and an accurate routing of information in the network.

Consider an example case where there is a standby and an active endpoint. The standby endpoint can become involved in a communication stream with a remote peer in cases where the active endpoint fails. During the initial communication, there is synchronization data, which propagates during the communication session (e.g., sequence numbers). Where sequence numbers become disorganized or are inaccurate, network communications can fail. Stated in different terms, the tunnel or link is vulnerable to miscommunications in the wake of a switchover (failover) to a redundant process (or processor).

Thus, the ability to offer a system or a protocol that offers an effective recovery system for network elements (without hindering system speeds, creating unnecessary overhead, or taxing processing capabilities of network components) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
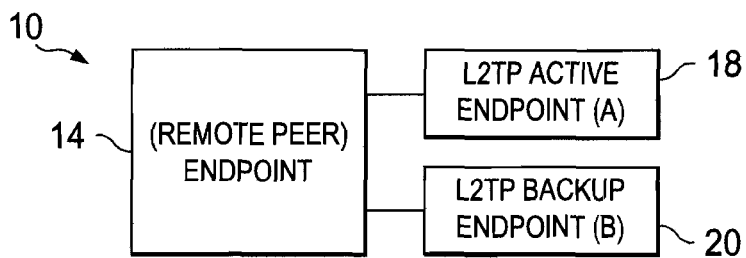
FIG. 1A is a simplified block diagram of a communication system for providing a recovery and a resynchronization for endpoints in a network environment in accordance with one embodiment of the present invention.

An apparatus is provided in one example embodiment and it includes a first node coupled to an active endpoint and a standby endpoint. The first node communicates with a second node. When the active endpoint experiences a failure, the standby endpoint is activated such that a communication involving the second node continues. The standby endpoint communicates a complete window's worth of packets to the second node after the failure, the window's worth of packets including a last known sequence number acknowledged by the second node. In more specific embodiments, the first node is an L2TP network server (LNS) and the second node is an L2TP access concentrator (LAC). The last known sequence number was check pointed by the active endpoint to standby endpoint.

Turning to the FIGURES, FIG. 1 is a simplified block diagram of a communication system 10 for providing recovery and resynchronization for endpoints in a network environment. FIG. 1 includes a remote peer endpoint 14, which is connected to an L2TP active endpoint (A) 18 and an L2TP backup endpoint (B) 20. Communication system 10 may include any suitable networking protocol or arrangement that provides a communicative platform for communication system 10. Thus, communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs.

In accordance with the teachings of the present invention, communication system 10 offers a peer-unaware recovery and resynchronization solution for L2TP control channels. In simplistic terms, the proposed method can solve the problem of recovering and resynchronizing the L2TP control channel sequence numbers after a switchover (failover) to a redundant process (or processor), when the primary process (or processor) undergoes a failure.

L2TP is a connection-oriented protocol that has shared state between active endpoints. Some of this shared state is vital for operation, but may be volatile (e.g., packet sequence numbers used on the L2TP control connection). When failure of one side of a control connection occurs, a new control connection is created and is associated with the old connection by exchanging information about the old connection.

Note that L2TP acts like a data link layer (layer 2 of the OSI model) protocol for tunneling network traffic between two peers over an existing network. L2TP can be a layer 5 protocol session layer and use the registered UDP port 1701. The entire L2TP packet, including payload and L2TP header, can be sent within a UDP datagram. It is common to carry Point-to-Point Protocol (PPP) sessions within an L2TP tunnel. L2TP does not provide confidentiality or strong authentication by itself. IPSec is often used to secure L2TP packets by providing confidentiality, authentication, and integrity.

The two endpoints of an L2TP tunnel are typically called the LAC (L2TP Access Concentrator) and the LNS (L2TP Network Server). The LAC is generally the initiator of the tunnel, while the LNS is the server that waits for new tunnels. Once a tunnel is established, the network traffic between the peers is bidirectional. To be useful for networking, higher-level protocols are then run through the L2TP tunnel. To facilitate this, an L2TP session is established within the tunnel for each higher-level protocol such as PPP. Either the LAC or LNS may initiate sessions. The traffic for each session is isolated by L2TP, so it is possible to set up multiple virtual networks across a single tunnel. The packets exchanged within an L2TP tunnel are categorized as either control packets or data packets.

In regards to the infrastructure of FIG. 1A, an L2TP device is a control connection endpoint (e.g., either a LAC or a LNS). The active endpoint is an endpoint that is currently providing service. The backup endpoint is a redundant endpoint standing by for possible assistance to the active endpoint, which has its database of active tunnels and sessions in sync with its active endpoint. The failed endpoint is the endpoint that was the active endpoint at the time of the failure. The recovery endpoint is the endpoint that initiates the failover protocol to recover from the failure of an active endpoint. The remote endpoint (R) is the endpoint that peers with the active endpoint before failure and with a recovery (e.g., standby) endpoint after failure.

The failover is the action of a backup endpoint taking over the service of an active endpoint. This could be due to administrative action or failure of the active endpoint. The old tunnel is a control connection that existed before failure and is subjected to recovery upon failover. The control channel failure is the failure of the component responsible for establishing/maintaining tunnels and sessions at an endpoint. The data channel failure is the failure of the component responsible for forwarding the L2TP encapsulated data.

For purposes of illustrating the techniques of communication system 10, it is important to understand the somewhat esoteric communications that may be traversing the network at any given moment. The following foundational information may be viewed as a basis from which the present invention may be properly explained. Such information is offered earnestly for purposes of explanation only and, accordingly, should not be construed in any way to limit the broad scope of the present invention and its potential applications.

In the case of a recovery, the goal of any L2TP architecture is to aid the overall resiliency of an L2TP endpoint. Thus, an ideal solution will minimize the recovery time of the L2TP layer after a failover, while also minimizing the impact on its performance. Therefore, it is assumed that the endpoint's overall architecture is also supportive in the resiliency effort. To ensure proper operation of an L2TP endpoint after a failover, the associated information of the control connection and sessions between them must be correct and consistent. This includes both the configured and dynamic information. The configured information is assumed to be correct and consistent after a failover, otherwise the tunnels and sessions would not have been setup in the first place. The dynamic information, which is also referred to as stateful information, changes with the processing of the tunnel's control and data packets. Currently, only such information that is essential to the tunnel's operation is its sequence numbers and tunnel/session IDs. For the tunnel control channel, the inconsistencies in its sequence numbers can result in the termination of the entire tunnel. For tunnel sessions, the inconsistency in its sequence numbers, when used, can cause significant data loss, thus giving the perception of "service loss" to the end user. Therefore, an optimal resilient architecture that aims to minimize "service loss" after a failover must make provision for the tunnel's essential stateful information (i.e., its sequence numbers).

Turning to an example that is illustrative of the teachings of the present invention, active and backup endpoints may reside on the same device; however, they are not required to be that way. In some instances, some devices may not have a standby module altogether, in which case the failed endpoint, after reset, can become the recovery endpoint to recover from its prior failure. Therefore, upon A's (active endpoint's) failure, endpoint A would be called the failed endpoint in the example of FIG. 1A.

If B were present, then it would become the recovery endpoint and also an active endpoint. If B is not present, then after A resets, it could become the recovery endpoint provided it saved the information about active tunnels/sessions in some persistent storage.

Example embodiments of the present invention offer a method in which a peer node of an L2TP control channel can recover sequence numbers after a switchover (failover) to the redundant process (or processor) when the primary process (or processor) undergoes a failure. To accomplish its operations, the present architecture can perform of a "flush of the sequence window" to resynchronize the sequence numbers in a deterministic manner. Such a solution does not require the check pointing of all sequence numbers sent and received from the process (or processor), which experienced a failover.

In one example, any part of the node that experiences the failure (e.g., either active endpoint A or standby endpoint B) can include appropriate software to execute the described operations in an example embodiment of the present invention. As used herein in this Specification, the term 'node' is meant to encompass LNSs, LACs, routers, switches, gateways, bridges, loadbalancers, firewalls, or any other suitable device, network appliance, server, component, element, or object operable to exchange information in a network environment. In one example implementation, the failed node includes software to achieve the optimal recovery operations, as outlined herein in this document.

In other embodiments, this feature may be provided external to the failed node or included in some other network device to achieve this intended functionality. Alternatively, both the failed node and the remote peer endpoint include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving recovery and resynchronization in a network environment.

Each of these nodes (peer and active/standby) can also include memory elements for storing information to be used in achieving the recovery operations as outlined herein. Additionally, each of these devices may include a processor that can execute software or an algorithm to perform the recovery activities as discussed in this specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Figure 1B:
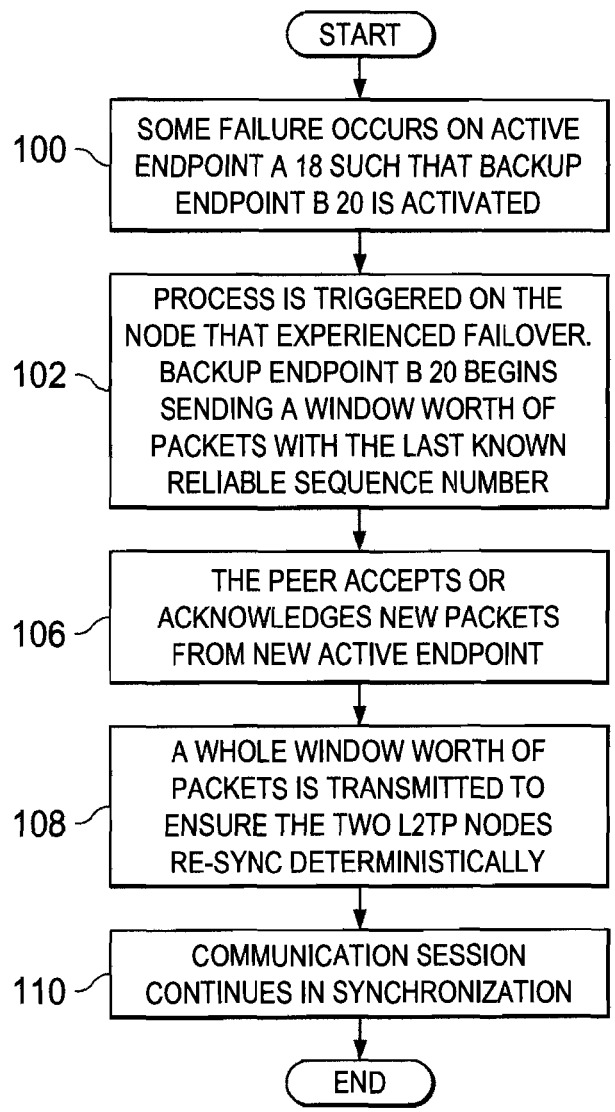
FIG. 1B is a simplified flowchart illustrating a series of example steps associated with the communication system.

Turning to FIG. 1B, FIG. 1B is a simplified flowchart illustrating some example steps associated with a recovery and a resynchronization of packets in an L2TP environment. For this example, FIG. 1A and its respective components can be referenced for illustrative purposes. At step 100 of FIG. 1B, there is some failure that occurs on active endpoint A 18 such that backup endpoint B 20 is activated.

At step 102, a new active process is triggered on the node that experienced failover (e.g., a the backup endpoint). Backup endpoint B 20 begins sending a window's worth of packets with the last known reliable sequence number. This involves generating a new packet, which will need to be accepted by the peer L2TP node. Backup endpoint B 20 creates new control packets (like the L2TP HELLO packets), which the peer will be bound to accept, or acknowledge receiving at step 106. Note that the new packets can use an older sequence number, which was already received by the peer L2TP node. This sequence is known since it was check pointed on the failing L2TP node, from the Active endpoint to the standby endpoint. To actually resynchronize with the peer involves more than simply sending an older packet because it is important to identify that the peer is acknowledging the newly sent packet. It could be the case that the acknowledgement packet was some old packet in the network, or other packets in the window were dropped in the network.

These activities are performed in order to drain any such packets that were already in the network (sent from the previously active process (or)). A whole window's worth of packets should be transmitted since there could be such packets outstanding in the network (sent to the old-active process), which are now being delivered to the new active. This is illustrated at step 108. Hence, the "flush of the sequence window" is important for ensuring the two L2TP nodes resynchronize deterministically.

Stated in other terms, the "flush of the sequence window" mechanism ensures that the node that experienced a failover can reliably arrive at the actual sequence number to use for communicating with the peer L2TP node. This ensures that these new sequence numbers will not be discarded by the peer as a duplicate (i.e. old) sequence number: regardless of whether the failed process may (or may not) have actually transmitted some of these sequence numbers, the peer may (or may not) have received those packets, or the peer may (or may not) have processed them if already received. At step 110, the communication session can continue in synchronization.

In one example implementation, in order to reduce the number of HELLOs sent for the window size, the system could send a control packet like ICRQ/OCRQ before the HELLOs. This ICRQ/OCRQ will have an unused session ID (which could be reserved, for instance, to ensure the unused status). If a reply is received from the peer for this ICRQ/OCRQ (which can be determined from the replying ICRQ/OCRP's session ID), it is safe to advance the sequence number and, thus, reduce the number of control packets required to be sent to flush the window. There are a number of advantages that such an architecture can achieve. For example, the solution outlined herein can be supported on all line cards on a given platform. In one sense, the solution does not rely on the line card capacity.

Figure 2A:
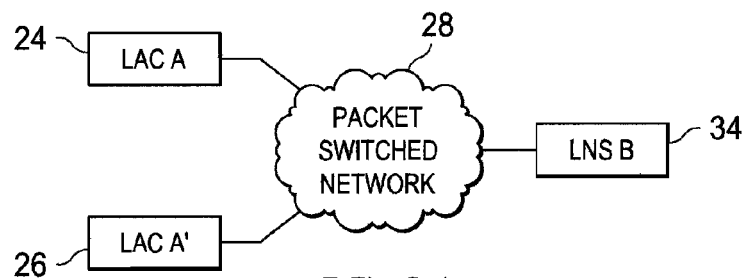
FIGS. 2A-2C represent a series of simplified example scenarios in accordance with several embodiments of the present invention.
Figure 2B:
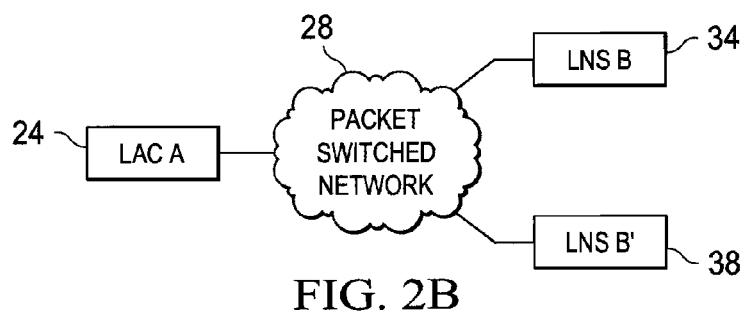
Figure 2C:
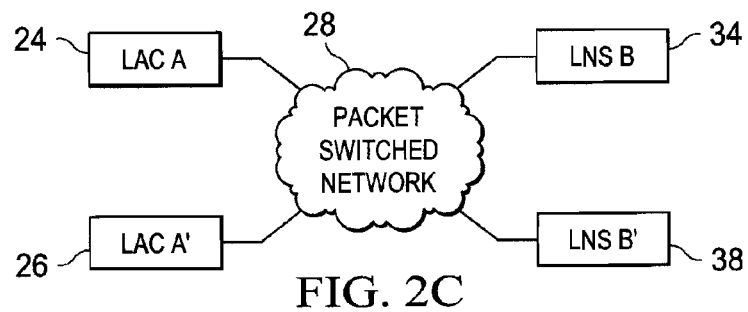

Turning now to FIGS. 2A-2C, these FIGURES depict some example arrangements that could benefit from the teachings of the present invention. FIGS. 2A-2C include a LAC A 24 and a LAC A' 26: both of which are connected to a public switched network (PSN) 28. In various embodiments, an LNS B 34 and optionally an LNS B' 38 are also connected to PSN 28.

To elaborate further in the context of another example flow, before a failure occurs, the active L2TP node A check points its sequence numbers to the standby L2TP node A' in regular intervals, which match the window size W of the L2TP transport. In this example, at the most, W windows are outstanding to be acknowledged by the peer. The node advertises its receive window size as W and, therefore, at most, W packets are outstanding on the peer.

For Scenario 1 (which is depicted by FIG. 2A), when a failover occurs, the new active L2TP node A', will start sending HELLO packets from the previously known sequence number N. It can receive an acknowledgement for this packet in three ways: a) an acknowledgement for the new packet N that was sent out from A', if this was not received by B before (network failure to deliver to B) even though A had sent it; b) an acknowledgement for a previous packet N that was sent out from the previous active node A, but the ACK was delivered to A'; c) an acknowledgement for the new packet N that was sent out from A', even though this was sent from A and received by B before. This is because the peer node is supposed to acknowledge an older packet it may have received (e.g., a duplicate). In these cases, it means that the peer L2TP node B will have received the packet N.

The algorithm makes sure that the peer has received the other packets N+1, N+2, . . . up to W packets, within the window size. To make sure the peer will start accepting the new packets (and does not drop the packets or mistake them as an old packet or as a future packet), the node A' will have to send individual packets N+1, N+2, . . . up to N+(W−1) to resynchronize deterministically with the peer.

Once A' receives an acknowledgement for N+(W−1), which is the flush of the sequence window, it has successfully resynchronize and can start sending new control packets. This flush is important and it cannot be assumed that N+(W−1) is the next packet to be sent out, since the peer may not have received all the packets in the window W. This is a deterministic way to reconcile.

These operations apply to the scenarios of FIGS. 2B and 2C, as well. In addition, the other issues with failover recovery (e.g., the session ID and tunnel ID reconciliation and application state reconciliation) can complement this sequence number recovery algorithm for offering a complete solution.

It is also worth noting that in the FIG. 2 set of illustrations, there could be scenarios involving a multi-hop node and a given LAC/LNS. The multi-hop node can serve as an intermediate L2TP node such that the pathway could be formed (logically, not necessarily physically) as: LAC - - - multi-hop node - - - LNS. Along similar reasoning, there could be an arrangement where a multi-hop node A could be coupled to both the LAC and a multi-hop node B element. This is a slight modification of FIG. 2C. In addition, there could be a similar scenario involving an LNS. In such a case, the multi-hop node A could be coupled to both the LNS and a multi-hop node B element. This represents a slight modification of FIG. 2D.

Note that the method described above may not be ideal for all architectures from an implementation perspective, given the amount of check pointing and the frequency/assumptions. The is due, in part, to the solution assuming that the "sent" controls packets are check pointed before being sent out on the wire, and received control packets are check pointed before processed. To avoid such stringent requirements and to reduce the latency of the sessions on the active node, there are alternative embodiments presented herein. These alternatives do not have any constraints on the congestion avoidance algorithm used by a L2TP implementation.

Such alternatives operate in the following manner. The active node L2TP manager processes and sends out control packets as normally done, but assumes a window size of Wo for the receive window size (RWS), and Wp for the peer's RWS (where Wo is between 4 and 20, depending on the platform capacity). This could be made configurable/tuned for the given platform/image (where Wp is the minimum peer's advertised RWS, Wo). Even though the peer has advertised a larger RWS, the node cannot handle sending an unlimited number of control packets, as it is preferable to send a smaller fixed size window of packets for later recovery of Ns after failover. The same applies to the RWS, since it aids in the recovery of Nr after failover. For convenience, assume Wo=Wp here, otherwise the steps need to be changed, as per the correct window size accordingly.

The manager uses reliable check pointing for synchronizing the Ns, Nr values to the standby node L2TP manager at "regular sequence intervals". This could be made configurable/tuned for the platform/image as well.

After switchover, the newly active manager can use the low and high watermark Ns to trigger probes to the peer, to extract responses from the peer to learn about the Ns/Nr range indicators. Once these range-indicators are learned, the flush of the sequence window can be used from those Ns values.

The newly active manager can use a slow start while recovering to grow the window until the max RWS is reached [with the sequence numbers starting at the one gleaned from the probe response from the peer]. This new active manager expects the peer to acknowledge all these sequence numbers (up to a window's worth of packets). If there is any jump in the sequence numbers outside this window (Ns1+20) in the Nr from the peer's control packets, then the Ns1 is moved to the newly learned Ns (from the peer's Nr) and the flushing of the sequence numbers is restarted. In this way, the manager resynchronizes with the peer. If there is any Nr in the peer's control packets that are older than the current assumed Ns1, then that is assumed to be an old packet and a zero-length body (ZLB) ACK is sent for it.

In terms of a reliable session ID reconciliation, all the session IDs that are put out on the network or learned from the peer are used for a clean reconciliation of the session state after failover. Hence, the active node L2TP manager has to check point the session IDs that are learned from the peer, or the session IDs it is putting on the wire to inform its peer. In this way, when the switchover happens following a failure, the newly active L2TP manager can tear down the un-established sessions, either on this node or on the peer L2TP node. This mainly applies to the session IDs sent from the peer and the system can tear down those sessions after switchover and not leave the peer with these session/state in an uncertain state. It also applies to session IDs sent to the peer, so the system does not reuse these session IDs sooner than warranted to cause misbehavior for the PPP endpoints.

The active can maintain a set (database or tree) of session IDs as soon as it learns them and check points them to the standby. The standby can keep track of these session IDs and remove them from the database once these sessions are established through the L2TP application check point (on the standby as well). Thus, after the switchover, the session ID database on the newly active manager should contain only the IDs for sessions that did not survive the switchover, and need to be cleaned up, which can be done by sending the call disconnect notify (CDN) messages. In addition, CDNs can be sent with the assigned session IDs and this would take care of the cases where the peer's local session ID for this corresponding session has not been learned.

Functionally, this would mean at the LAC or Mhop [multi-hop] node (i.e., for initiating a session), the following occurs: i.) check point local session ID before sending out ICRQ; and ii.) check point remote session ID after receiving ICRP. At the LNS or Mhop node for terminating a session, the following occurs: i.) check point remote session ID after receiving ICRQ; ii.) check point local session ID before sending ICRP (and remote session ID as well).

For the receiving CDNs, if CDNs are received and the ZLB ACK is sent to the peer, and if a switchover happens before the application has got the disconnect notification, then the L2TP node could be stuck with a stale dangling session state. To avoid this, the session ID should be cleaned as to be check pointed to the standby before sending the ZLB ACK to the peer. The same would apply to the case when the CDN is being transmitted from this node. Alternatively, the protocol could check point this session ID before disconnecting the application to reduce this window.

If the CDN has been received and the switchover happens before the ZLB ACK has been sent to the peer, then it is not an issue since the peer would retransmit the CDN to the newly active L2TP manager. In addition, when the newly active manager is recovering, the control messages received from the peer are gleaned for any new session IDs learned so they can be terminated with a CDN later after the sequence numbers are recovered. These messages (received until recovery) are not sent to the application.

In terms of a typical processing summary on the active L2TP manager, the following failure description is offered:

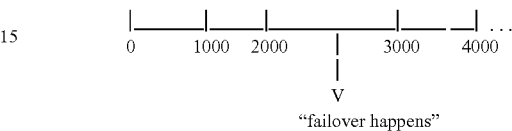

"failover happens"

This is an outline of intervals at which the "reliable" check point of Ns/Nr is done to the standby L2TP manager. Suppose a failover happens at the interval between 2000 and 3000, then the standby would have:

Check point information of Ns/Nr done at the 2000th mark;

The reliable session ID check point information of the known session IDs in the established and un-established state; and The newly active L2TP manager chooses these two watermarks low and high (2000 and 3000) for sending out HELLO/SLI messages to the peer "reliably".

For this last action, this is done since this will be acknowledged by the peer as a duplicate message, but with the correct Nr (which would be the Ns "range indicator") and next Ns (which would be the Nr "range indicator"). Note the peer could also piggyback this on a new control packet, which would be as good as a ZLB ACK. Also, note that the control packet the newly active L2TP manager receives after sending out the first "low watermark" control packet could be a packet that was in the network, but which was delivered to the newly active RP only after the failover. This may not be the expected ACK, but an old packet that could indicate the Ns, Nr closer to the one needed. The architecture should start using these in the Ns/Nr in the "probe" control packet retransmission since it has to be delivered reliably. The architecture should then send a Wp (=Wo here) window's worth of L2TP control packet "probes."

The Ns "range indicator" can help the system to learn the actual Ns through a repeated "flush of the sequence window" to ensure the system is not off mark due to stale packets delivered to the newly active l2TP manager after failover. In addition, as the system is in the "recovering" mode, in trying to send a Wo window worth of probes, the system needs to adjust out Ns when it receives new information on the Ns "range indicator" and restarts the probe. This is to handle the cases of the stale control packets in the network, which are delivered to the newly active L2TP manager only after the switchover.

At the end of these transmission cycles (using slow start), this newly active L2TP manager will have recovered its Ns and, further, learned about the Nr range indicator (to ACK the peer's packets). Initial probes will always use the last check pointed Nr value, the peer would just ignore these values since it would not be later than what it has already cleared from the retransmit queue. At the end of the initial probe ('recovering state'), the Nr would be the earliest Ns from all the received control packets from the peer. By this time, the peer's retransmission would have triggered its retransmit queue control packets to be retransmitted.

To be conservative, the L2TP manager can use the (Nr–Wo) as Nr, when sending the first control packet in the recovered state, while the reconcile is happening. At the end of reconciliation, the Nr should have been established. The newly active control change can use some mechanisms to verify that it has recovered the sequence numbers (e.g., opening a session with new ID and sending CDN to the received ICRP). If no ICRP/CDN were received from the peer for this session, then it would mean the recovery has failed. If the verification/validation fails, then it could restart the recovery process by using the latest Ns/Nr, which has been learned so far. This could be repeated several times. Otherwise, the tunnel should be terminated to avoid delays in establishing/ accepting new calls/sessions.

After the verification, the system could start clearing the sessions it knows as un-established to clear any state on the peer, and so that it can re-use any session IDs later without the need to be concerned about stale session IDs on the network. At the end of this transmission cycle, the control change is fully recovered and reconciled to start accepting/initiating new L2TP sessions on this control channel.

Taking the example outline above, suppose the 2000th mark check point contained the Ns/Nr as 2000/1500 and the active was at the window of Ns=2500–2520 (assuming Wo=Wp=20), Nr=1800. When the failover happens, the newly active l2TP manager, would send out a probe at with Ns/Nr as Ns=2000, Nr=1480 (1500–20). The system would probably get control messages that were already in the network (sent from the peer), but delivered to only the newly active manager now. These would have an Ns, Nr at [Ns=range of 1801-1820], [Nr=range of 2500-2520, depending on what the peer has received]. On receiving these packets, the newly active manager can advance the Ns to this Nr [i.e. range of 2500-2520], and update the Nr to this Ns [i.e. range of 1801-1820]. Thus, in the transmission of its probes, the newly active manager would use this as the new 'Ns' (i.e., the value in the range 2500-2520). The system would still keep the Nr as 1480 since it is unsure of what was the message the active had received, and it does not have enough state to acknowledge any further than that at this point in time.

Assume this Ns "range indicator" was 2500, then the newly active L2TP manager would send a window's worth of probes starting at this range indicator (2500-2520). Not all packets are sent at once, but a slow start is used to send these packets reliably. Unless it receives any new "range indicators," it will stick to these values and at the end of 2520, it should have recovered. It can then send the verification messages and after that, it can reconcile with the peer.

There could be a stale control packet out in the network (from the peer) with Ns/Nr as 2300/1600 that was delivered only after switchover. Then that would be the initial "range indicator" Ns, but subsequent transmission of probes will gather the information about the correct Ns to use. At the end of these repeated flushing of the sequence window operations, even the Nr would be learned.

Note that with the examples provided above, as well as numerous other examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 1B illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving routing protocols, communication system 10 may be applicable to other exchanges, routing protocols, or routed protocols in which packets (not necessarily the routing protocol described) are exchanged in order to provide optimal routing and recovery in a network environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
communicating, via a first node, with a second node, wherein the first node is coupled to an active endpoint and a standby endpoint;
activating the standby endpoint when the active endpoint experiences a failure such that a communication involving the second node continues; and
communicating a complete window's worth of packets to the second node after the failure, the window's worth of packets including a last known sequence number acknowledged by the second node, wherein the first node is an L2TP network server (LNS) and the second node is an L2TP access concentrator (LAC), wherein the standby endpoint is configured to communicate a control packet prior to propagation of HELLO packets, wherein the standby endpoint creates a particular control packet associated with an Incoming Call Request/Outgoing Call Request (ICRQ)/(OCRQ) format to be sent to the second node, the particular control packet having an unused session ID that is reserved.

2. The method of claim 1, wherein the last known sequence number was check pointed to the standby endpoint.

3. The method of claim 1, wherein the standby endpoint creates a new packet to be sent to the second node and the new packet is electronically acknowledged by the second node.

4. The method of claim 1, wherein if the first node receives an acknowledgement for the control packet, a sequence number is advanced for a communication involving the first and second nodes.

5. Logic encoded in one or more tangible non-transitory media for execution and when executed by a processor operable to:
communicate, via a first node, with a second node, wherein the first node is coupled to an active endpoint and a standby endpoint;
activate the standby endpoint when the active endpoint experiences a failure such that a communication involving the second node continues; and
communicate a complete window's worth of packets to the second node after the failure, the window's worth of packets including a last known sequence number acknowledged by the second node, wherein the first node is an L2TP network server (LNS) and the second node is an L2TP access concentrator (LAC), wherein the standby endpoint is configured to communicate a control packet prior to propagation of HELLO packets, wherein the standby endpoint creates a particular control packet associated with an Incoming Call Request/Outgoing Call Request (ICRQ)/(OCRQ) format to be sent to the second node, the particular control packet having an unused session ID that is reserved.

6. The logic of claim 5, wherein if the first node receives an acknowledgement for the control packet, a sequence number is advanced for a communication involving the first and second nodes.

7. The logic of claim 5, wherein the last known sequence number was check pointed to the standby endpoint.

8. The logic of claim 5, wherein the standby endpoint creates a new packet to be sent to the second node and the new packet is electronically acknowledged by the second node.

9. A system, comprising:
means for communicating, via a first node, with a second node, wherein the first node is coupled to an active endpoint and a standby endpoint;
means for activating the standby endpoint when the active endpoint experiences a failure such that a communication involving the second node continues; and
means for communicating a complete window's worth of packets to the second node after the failure, the window's worth of packets including a last known sequence number acknowledged by the second node, wherein the first node is an L2TP network server (LNS) and the second node is an L2TP access concentrator (LAC), wherein the standby endpoint is configured to communicate a control packet prior to propagation of HELLO packets, wherein the standby endpoint creates a particular control packet associated with an Incoming Call Request/Outgoing Call Request (ICRQ)/(OCRQ) format to be sent to the second node, the particular control packet having an unused session ID that is reserved.

10. The system of claim 9, wherein the standby endpoint creates a new packet to be sent to the second node and the new packet is electronically acknowledged by the second node.

11. The system of claim 9, wherein if the first node receives an acknowledgement for the control packet, a sequence number is advanced for a communication involving the first and second nodes.

12. The system of claim 9, wherein the last known sequence number was check pointed to the standby endpoint.

13. An apparatus, comprising:
a first node coupled to an active endpoint and a standby endpoint, wherein the first node communicates with a second node, and wherein when the active endpoint experiences a failure, the standby endpoint is activated such that a communication involving the second node continues, and wherein the standby endpoint communicates a complete window's worth of packets to the second node after the failure, the window's worth of packets including a last known sequence number acknowledged by the second node, wherein the first node is an L2TP network server (LNS) and the second node is an L2TP access concentrator (LAC), wherein the standby endpoint is configured to communicate a control packet prior to propagation of HELLO packets, wherein the standby endpoint creates a particular control packet associated with an Incoming Call Request/Outgoing Call Request (ICRQ)/(OCRQ) format to be sent to the second node, the particular control packet having an unused session ID that is reserved.

14. The apparatus of claim 13, wherein the last known sequence number was check pointed to the standby endpoint.

15. The apparatus of claim 13, wherein the standby endpoint creates a new packet to be sent to the second node and the new packet is electronically acknowledged by the second node.

16. The apparatus of claim 13, wherein if the first node receives an acknowledgement for the control packet, a sequence number is advanced for a communication involving the first and second nodes.

* * * * *